(12) United States Patent
Anderson

(10) Patent No.: US 9,134,403 B1
(45) Date of Patent: Sep. 15, 2015

(54) SYSTEM AND METHOD FOR RELATIVE LOCALIZATION

(71) Applicant: Roger J. Anderson, Panama City, FL (US)

(72) Inventor: Roger J. Anderson, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 407 days.

(21) Appl. No.: 13/771,909

(22) Filed: Feb. 20, 2013

(51) Int. Cl.
| | |
|---|---|
| G01S 1/02 | (2010.01) |
| G01S 13/06 | (2006.01) |
| G01S 1/08 | (2006.01) |
| G01S 1/20 | (2006.01) |
| G01S 3/00 | (2006.01) |
| G01S 3/02 | (2006.01) |
| G01S 5/08 | (2006.01) |

(52) U.S. Cl.
CPC . *G01S 13/06* (2013.01); *G01S 1/02* (2013.01); *G01S 1/08* (2013.01); *G01S 5/08* (2013.01); *G01S 1/20* (2013.01); *G01S 3/00* (2013.01); *G01S 3/02* (2013.01)

(58) Field of Classification Search
CPC .............. G01S 1/00; G01S 1/02; G01S 1/08; G01S 1/20–1/36; G01S 3/00; G01S 3/02; G01S 3/72; G01S 5/04–5/14
USPC .................. 342/107, 113, 118, 146, 147–158
See application file for complete search history.

(56) References Cited

U.S. PATENT DOCUMENTS

| | | | | |
|---|---|---|---|---|
| 3,665,464 | A * | 5/1972 | Meilander ...................... 342/36 |
| 4,466,067 | A * | 8/1984 | Fontana ........................ 701/300 |
| 6,542,114 | B1 * | 4/2003 | Eagleson et al. .......... 342/357.25 |
| 7,062,381 | B1 * | 6/2006 | Rekow et al. .................. 701/300 |
| 7,132,981 | B1 * | 11/2006 | Roberts .......................... 342/442 |
| 7,286,077 | B2 * | 10/2007 | Falcati et al. .................... 342/33 |
| 7,289,466 | B2 * | 10/2007 | Kore et al. ...................... 370/328 |
| 7,603,129 | B2 * | 10/2009 | Gonia et al. ................ 455/456.1 |
| 7,889,115 | B2 * | 2/2011 | Clingman et al. ............... 342/42 |
| 2004/0032363 | A1 * | 2/2004 | Schantz et al. ................ 342/127 |
| 2005/0046608 | A1 * | 3/2005 | Schantz et al. ................ 342/127 |
| 2006/0181411 | A1 * | 8/2006 | Fast et al. .................. 340/539.13 |
| 2008/0036652 | A1 * | 2/2008 | Shore et al. .............. 342/357.06 |
| 2008/0291089 | A1 * | 11/2008 | Seong et al. ................... 342/387 |
| 2008/0316104 | A1 * | 12/2008 | Seong et al. ................... 342/442 |
| 2010/0066503 | A1 * | 3/2010 | Rhie et al. ..................... 340/10.1 |
| 2011/0110338 | A1 * | 5/2011 | Khoryaev et al. ............. 370/335 |
| 2011/0282901 | A1 * | 11/2011 | Marks et al. ................... 707/769 |

* cited by examiner

*Primary Examiner* — Peter Bythrow
(74) *Attorney, Agent, or Firm* — James T. Shepherd

(57) ABSTRACT

Localization systems and methods for unambiguously determining the range, bearing, and relative heading of a neighboring object relative to a reference point are provided. The systems and methods utilize a triangulation-based approach, wherein the range and heading information is based on measurements of angles between a reference coordinate system superposed on the reference point to a minimum of three target points on the neighboring object. The target points can include a minimum of three uniquely discernible beacons mounted to the neighboring object. A sensor capable of detecting the beacons is mounted at the reference point. The range and heading of the neighboring object can be calculated by an analysis of the geometries of the beacons and the reference point.

16 Claims, 4 Drawing Sheets

SYSTEM AND METHOD FOR RELATIVE LOCALIZATION

STATEMENT OF GOVERNMENT INTEREST

The invention described herein may be manufactured and used by or for the Government of the United States of America for governmental purposes without the payment of any royalties.

BACKGROUND OF THE INVENTION (1) Field of the Invention

The present invention relates to localization. More particularly, the present invention relates to localization systems and methods to unambiguously determine the range, bearing, and relative heading of an object relative to a reference point.

(2) Description of the Prior Art

Localization approaches can be broadly categorized by methods that use direct measurement of range and bearing information with derived heading, or that use some form of trilateration (range-based) or triangulation (angle-based) algorithm to determine state information not directly measured. Examples of techniques that use direct measurements of range and bearing are radar, sonar, and lidar.

When the transmitter(s) and receiver(s) are co-located, range is based on either time-of-flight or frequency modulation, and bearing may be determined by using gimbaled elements or multiple elements, including phased arrays. Using the Doppler effect, the radial velocity component of a contact can be determined, but the total velocity can only be determined from a series of measurements.

Trilateration approaches to localization use measured range information to reference points about which some absolute or relative position information is known to determine a position relative to these references. An example of a trilateration system is GPS, which uses derived range information from multiple satellites serving as beacons.

A key feature of GPS is that range information is based on a known satellite broadcast schedule, which is known to all receivers. A major disadvantage of GPS is signal availability. In regions with sufficient interference such as canyons, streets surrounded by high structures, or indoors, position cannot be determined. Additionally, commercial GPS accuracy limits the ranges at which coordination of multiple agents such as autonomous mobile vehicles can practically occur.

Acoustic long and short baseline navigation systems are local trilateration techniques, and require a minimum of three reference beacons with positions known to a central controller or to the object being localized. Limitations of long baseline navigation include the requirement to accurately determine the relative locations of the beacons, the potential difficulties in placing beacons in a navigable area, and limitations in range associated with aliasing. Short baseline systems partially mitigate some of the limitations of long baseline systems, although accuracy typically decreases.

Acoustic ultra-short baseline systems use time-of-flight information to obtain range, but can calculate bearing from the phase difference of signals. For almost all acoustic baseline system applications, scalability to multi-vehicle operations is a limitation. If the configuration requires vehicles to transmit in order to localize, long periods between transmissions will result when a sufficient number of vehicles are used if signals are required to be vehicle-specific. These long periods equate to infrequent updates that make the system impractical.

Triangulation approaches to localization use measured angular information to reference points about which some absolute or relative position information is known to determine a position relative to these references. A triangulation algorithm typically requires two reference locations with a known distance between them and the angles relative to the baseline formed by these reference locations to the object to be localized to determine the relative object position.

An illustrative triangulation approach is optical three-dimensional localization using stereo vision. This approach uses two cameras with known distance and orientation relative to each other. The angles to a particular location in space taken from each of the images are used to calculate the range from each camera. Practical limitations include compensating for distortions in images from the lenses, methods to ensure the images are comparable, and the accuracy of methods to correlate features in each image.

Structured light is also based on a triangulation technique, although a paired emitter and receiver form the baseline rather than two sensors. Limitations to structured light include difficulty in detecting transparent, translucent, or reflective materials and surfaces with certain curvatures. The structured light approach would also necessitate the use of some object recognition or tracking algorithm to identify features of the object used for localization.

Object recognition is a machine learning approach to localization that does not rely on active radiation or a trilateration or triangulation algorithm in use, although information used to train the system may employ one or more of these methods. In the case of relative localization, a recognition algorithm would need to be trained with a set of images of an object from a variety of ranges and orientations. Potential disadvantages are the possibility of a large training set necessary to suitably characterize the object to be localized and the processing required to identify relevant portions of an image.

A disadvantage of all of the localization techniques described, except the object recognition approach, is that the instantaneous heading information can not be calculated from a single measurement. A time series consisting of a minimum of two positions is required to determine relative velocity. In the case of a moving reference point, such as a mobile robot, the motion of the reference must be taken into account to determine the relative velocity and heading of the localized object, meaning the actual motion of the reference point must be known.

Thus, a need has been recognized in the state of the art to provide localization systems and methods that are low cost and achievable with commonly available cameras and known image processing algorithms, while also having an accuracy comparable or better to other known localization techniques. Additionally, the systems and methods should be capable of being used in a variety of applications requiring relative range, bearing, and/or heading localization. Further, the systems and methods should enable scalable multi-agent interaction, such as coordination of multiple autonomous agents.

SUMMARY OF THE INVENTION

It is therefore a general purpose and primary object of the present invention to provide localization systems and methods for unambiguously determining the range, bearing, and relative heading of a neighboring object relative to a reference point. The systems and methods utilize a triangulation-based approach, wherein the range and heading information is based on measurements of angles between a reference coordinate system superposed on the reference point to a minimum of three target points on the neighboring object.

The target points can include a minimum of three uniquely discernible beacons mounted to the neighboring object. A sensor capable of detecting the beacons is mounted at the reference point. The range and heading of the neighboring object can be calculated by an analysis of the geometries of the beacons and the reference point.

In one embodiment, a method for localization of a first target includes sensing at a reference point a relative position of each of three or more beacons that have a predetermined geometric relationship on the target, determining a bearing angle for each of the beacons relative to the reference point, and determining a configuration of the beacons based on the relative position. The method also includes calculating a range from each of the beacons to the reference point based on the predetermined geometric relationship, the bearing angle for each of the beacons and the configuration. The method additionally includes determining a heading of the target relative to the reference point based on the ranges for the beacons and the configuration.

In one embodiment, calculating the ranges further includes calculating an angle between a line, $r_R$, from the reference point, O, to a rightmost one of the beacons, R, and a line, $\lambda_R$, from a center one of the beacons, C, to R. Calculating an angle can include numerically analyzing an expression for the angle, $\alpha_R$, wherein:

$$\lambda_L \sin(\pi + \beta_L + \beta_R - \theta_{LR} - \alpha_R)\sin(\theta_{RC}) = \lambda_R \sin(\theta_{LC})\sin(\alpha_R),$$

when the configuration has a line, $r_C$, from point O to C that intersects a line, $\lambda_C$, between a leftmost one of the beacons, L, and R. When the configuration is such that line $r_C$ does not intersect line $\lambda_C$, the expression takes the form of:

$$\lambda_L \sin(\pi - \beta_L - \beta_R - \theta_{LR} - \alpha_R)\sin(\theta_{RC}) = \lambda_R \sin(\theta_{LC})\sin(\alpha_R),$$

wherein, in both expressions:
$\lambda_L$ is a line from L to C;
$\beta_L$ is an angle formed between line $\lambda_L$ and line $\lambda_C$;
$\beta_R$ is an angle formed between line $\lambda_R$ and line $\lambda_C$;
$\theta_{LR}$ is an absolute value of a difference between a bearing of line $r_R$ and a bearing of a line, $r_L$, from point O to L;
$\theta_{RC}$ is an absolute value of a difference between the bearing of line $r_R$ and a bearing of line $r_C$; and
$\theta_{LC}$ is an absolute value of a difference between the bearing of line $r_L$ and the bearing of line $r_C$.

Further, calculating a range can include solving expressions for line $r_L$, line $r_C$ and line $r_R$, wherein, for said first configuration:

$$r_C = \frac{\lambda_L \sin(\pi + \beta_L + \beta_R - \theta_{LR} - \alpha_R)}{\sin(\theta_{LC})},$$

$$\frac{r_L}{\sin(\alpha_R - \beta_R)} = \frac{\lambda_C}{\sin(\theta_{LR})}$$

and $$\frac{r_R}{\sin(\pi + \beta_R - \theta_{LR} - \alpha_R)} = \frac{\lambda_C}{\sin(\theta_{LR})};$$

and, for said second configuration $$r_C = \frac{\lambda_L \sin(\pi - \beta_L - \beta_R - \theta_{LR} - \alpha_R)}{\sin(\theta_{LC})},$$

$$\frac{r_L}{\sin(\alpha_R + \beta_R)} = \frac{\lambda_C}{\sin(\theta_{LR})}$$

and $$\frac{r_R}{\sin(\pi - \beta_L - \theta_{LR} - \alpha_R)} = \frac{\lambda_C}{\sin(\theta_{LR})}.$$

In one embodiment, the method further includes emitting radiation from each of the beacons at differing wavelengths to enable identification. In one embodiment, the method further includes pulsing each of the beacons at differing frequencies to enable identification. In one embodiment, numerically analyzing includes application of Newton's method, a method of bisection, a genetic algorithm or an optimization algorithm.

In one embodiment, calculating a range includes analyzing expressions for the ranges, $r_L$, $r_C$ and $r_R$, wherein:

$$\lambda_L^2 = r_L^2 + r_C^2 - 2r_L r_C \cos(\theta_{LC}),$$

$$\lambda_R^2 = r_R^2 + r_C^2 - 2r_R r_C \cos(\theta_{RC})$$

and $$\lambda_C^2 = r_L^2 + r_R^2 - 2r_L r_R \cos(\theta_{LR}).$$

In one embodiment, the timing of emissions from the beacons can correspond with a predetermined schedule. Additional targets can be localized by differing the timing for each of the targets according to the schedule.

In one embodiment, a target localization system includes a set of at least three beacons located on the target in a predetermined geometric relationship and a sensor located a distance from the target and attuned to receive emissions from each of the beacons. The system can also include a processor connected to the sensor and processor readable medium disposed on the processor. The medium can contain instructions for determining a bearing angle for each of the beacons relative to said sensor and calculating a range from each of the beacons to the sensor based on the predetermined geometric relationship and the bearing angle for each of the beacons.

In one embodiment, the instructions also provide for determining a configuration of the beacons based on the bearing angle for each of the beacons and determining a heading of the target relative to the sensor based on the calculated ranges and the determined configuration. The system can also include a controller connected to the beacons, which pulses the beacons at differing frequencies to enable identification of each of the beacons by the sensor. The controller can also differ the wavelengths of the emissions from each beacon to enable identification.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like references numerals and symbols designate identical or corresponding parts throughout the several views and wherein.

DESCRIPTION OF THE INVENTION

Figure 1:
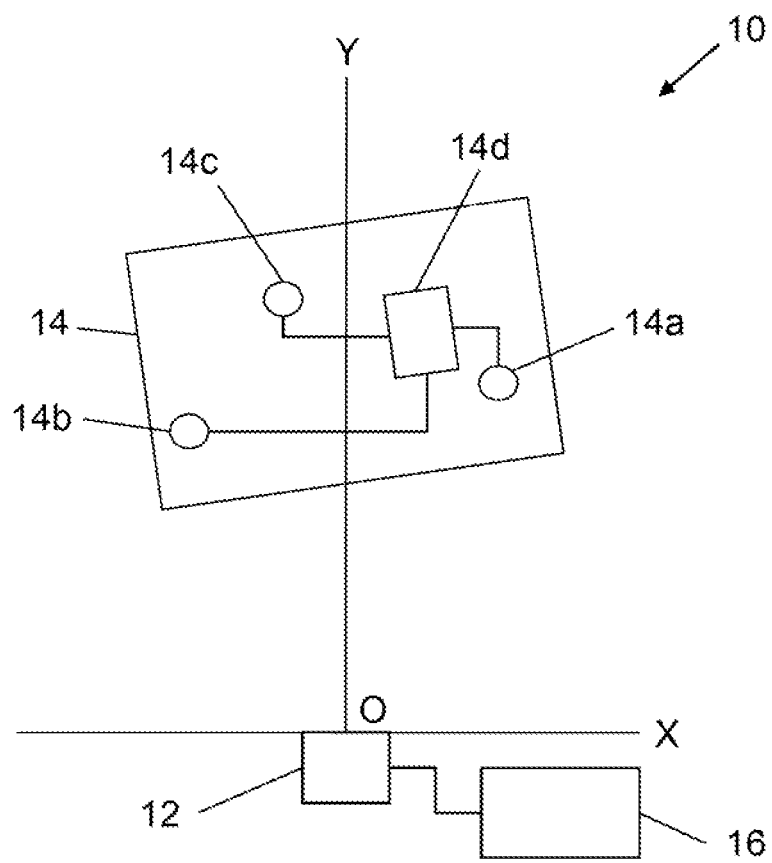
FIG. 1 illustrates a schematic plan view of a localization system.

Referring now to FIG. 1, there is shown a schematic plan view of localization system 10. Sensor 12 is located at reference point O. Sensor 12 is directed towards target 14 so as to detect target points, or beacons, 14a, 14b and 14c. Beacons 14a, 14b and 14c are uniquely identifiable by sensor 12 and have a known geometry on target 14.

The reference coordinate system is defined by orthogonal axes X and Y, wherein sensor 12 is directed along axis Y, i.e., axis Y is collinear with the center of the field of view of sensor 12. Additionally, controller 14d can provide for coordinated operation of beacons 14a, 14b and 14c, as may be required. Processor 16 is connected to sensor 12.

Figure 2:
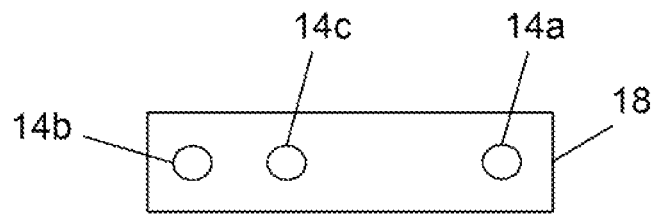
FIG. 2 illustrates an image captured by the system of FIG. 1.

Referring to FIG. 2, there is shown an idealized image 18 of beacons 14a, 14b and 14c captured by sensor 12 of FIG. 1. As shown in FIG. 2, beacons 14a, 14b and 14c lie in the horizontal plane defined by axes X and Y so as to simplify the geometry to two dimensions. However, it is understood that the approach described herein applies to the more general case of three dimensions, given that the geometry of beacons 14a, 14b and 14c on target 14 is known.

Figure 3A:
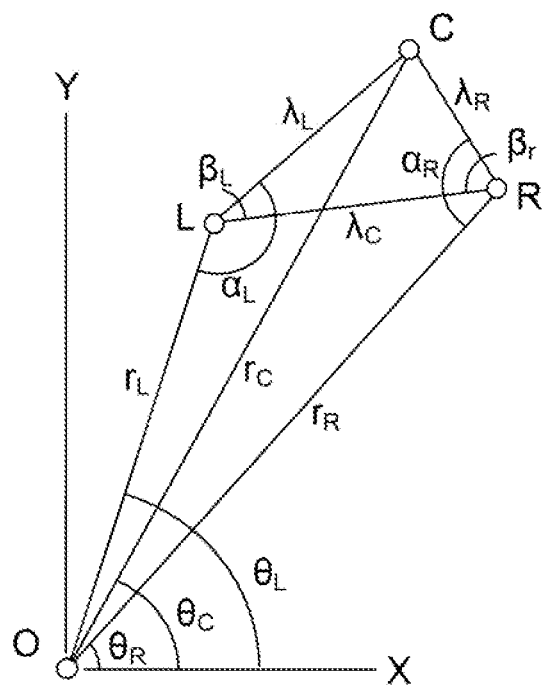
FIG. 3A illustrates one possible geometry for the system of FIG. 1.
Figure 3B:
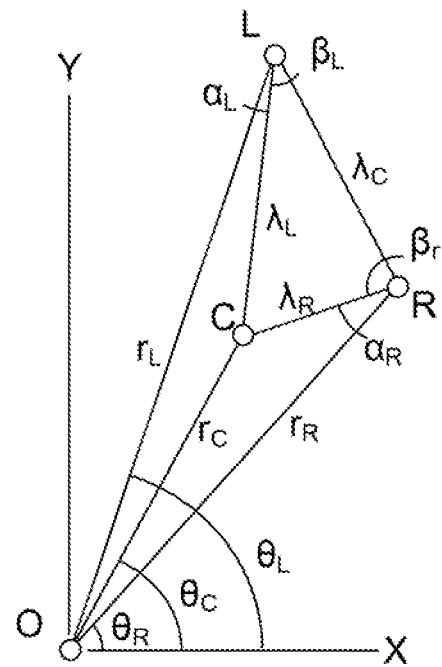
FIG. 3B illustrates another possible geometry for the system of FIG. 1.
Figure 4A:
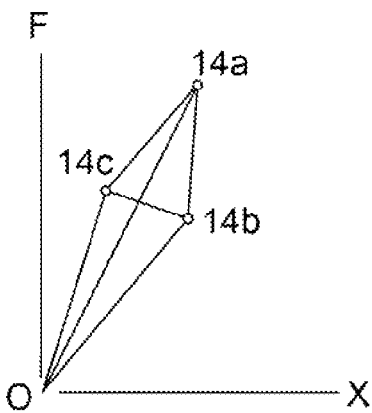
FIGS. 4A-4F illustrate possible geometries for the system of FIG. 1.
Figure 4B:
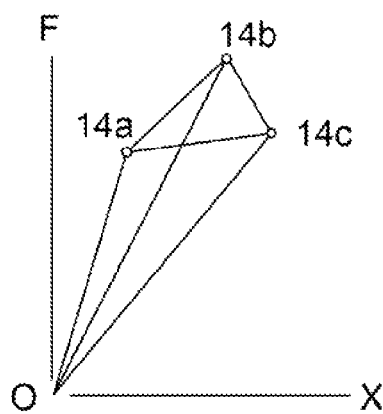
Figure 4C:
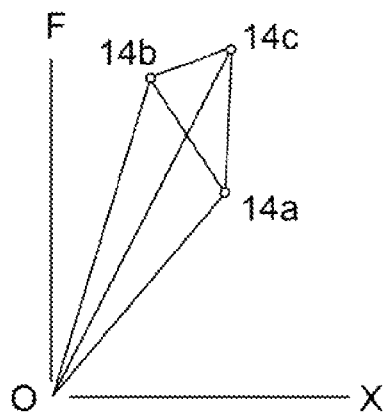
Figure 4D:
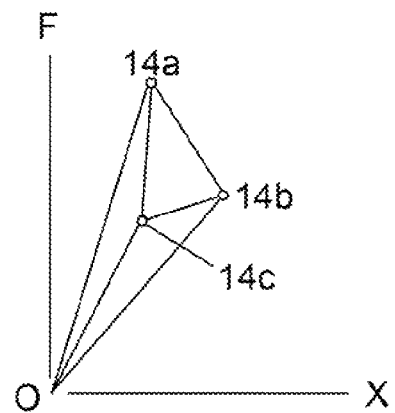
Figure 4E:
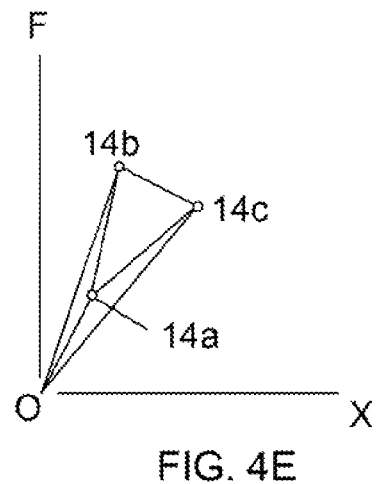
Figure 4F:
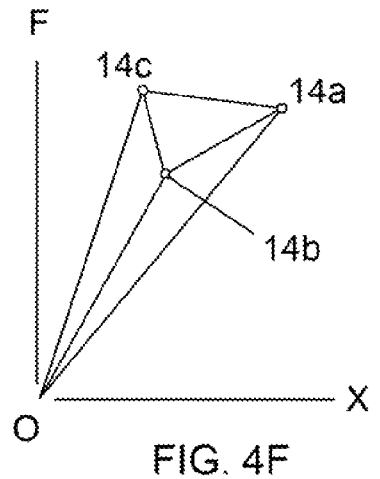

The range and heading of target 14 can be calculated by an analysis of the geometries of beacons 14a, 14b and 14c and reference point O. Referring also to FIGS. 3A and 3B, there are shown respective possible general geometries for system 10, as captured in image 18 illustrated in FIG. 2. Since FIGS. 3A and 3B illustrate general cases, positional assignments in the field of view of sensor 12 (L for leftmost, R for rightmost, and C for center) can be used to describe the positions of beacons 14a, 14b and 14c.

In both FIGS. 3A and 3B, L, C and R are distributed in triangle LRC, with lengths $\lambda_L$ between L and C, $\lambda_R$ between C and R and $\lambda_C$ between L and R. The two internal angles of triangle LRC at vertices L and R are $\beta_L$ and $\beta_R$, respectively. As previously mentioned herein, the geometry of triangle LRC is known. In FIG. 3A, C is located further from point O than is line $\lambda_C$ between L and R. In FIG. 3B, C is located closer to point O than is line $\lambda_C$. Thus, C lies outside triangle LRO formed by O, L and R in FIG. 3A, while C lies inside triangle LRO in FIG. 3B.

L, C and R are located at some initially unknown distances, or ranges, from reference point O, represented by $r_L$, $r_C$ and $r_R$, respectively. These lengths are oriented at respective angles $\theta_L$, $\theta_C$ and $\theta_R$ with respect to the reference coordinate system shown in FIG. 1. These angles are determined by processor 16, e.g., by mapping the positions of beacons 14a, 14b and 14c from image 18. Angles $\theta_{LC}$, $\theta_{RC}$ and $\theta_{LR}$ (not shown) are defined as the absolute differences between the measured beacon angles. Specifically, $\theta_{LC}=|\theta_C-\theta_L|$, $\theta_{RC}=|\theta_C-\theta_R|$ and $\theta_{LR}=|\theta_R-\theta_L|$. The angles $\alpha_L$ and $\alpha_R$ are formed at the intersections of lines $r_L$ and $\lambda_L$ and of lines $r_R$ and $\lambda_R$, respectively.

According to the law of sines, where the ratio of a leg of a triangle to the sine of the opposing angle is constant for a given triangle, the relationships given in the following equations are true:

$$\frac{\lambda_R}{\sin(\theta_{RC})} = \frac{r_C}{\sin(\alpha_R)} \quad [1]$$

$$\frac{\lambda_L}{\sin(\theta_{LC})} = \frac{r_C}{\sin(\alpha_L)}. \quad [2]$$

The angles formed at the intersections of lines $r_L$ and $\lambda_C$ and of lines $r_R$ and $\lambda_C$ are equal to $(\alpha_L-\beta_L)$ and $(\alpha_R-\beta_R)$, respectively. Using these values and the property that the interior angles of a triangle sum to $\pi$ radians, the angle $\alpha_L$ can be expressed as follows:

$$\alpha_L = \pi + \beta_L + \beta_R - \theta_{LR} - \alpha_R. \quad [3]$$

Substituting this expression for $\alpha_L$ into Equation [2] and arranging terms with respect to $r_C$ results in the following expression:

$$r_C = \frac{\lambda_L \sin(\pi + \beta_L + \beta_R - \theta_{LR} - \alpha_R)}{\sin(\theta_{LC})}. \quad [4]$$

Substituting this expression for $r_C$ into Equation [1] and rearranging terms results in $$\lambda_L \sin(\pi+\beta_L+\beta_R-\theta_{LR}-\alpha_R)\sin(\theta_{RC}) = \lambda_R \sin(\theta_{LC})\sin(\alpha_R), \quad [5]$$

in which the only unknown is $\alpha_R$.

The value of $\alpha_R$ can be solved numerically by any of a number of known algorithms such as Newton's method or the method of bisection in the region of $0 \leq \alpha_R \leq 360$. Two solutions are possible, although any negative angle can be disregarded. The value of $\alpha_R$ can be substituted into Equation [4] to solve for $r_C$.

Again using the law of sines, the following can be used to solve for $r_L$:

$$\frac{r_L}{\sin(\alpha_R-\beta_R)} = \frac{\lambda_C}{\sin(\theta_{LR})}. \quad [6]$$

Similarly, using the law of sines and substituting for $\alpha_R$ from Equation [3], the following can be used to solve for $r_R$:

$$\frac{r_R}{\sin(\pi+\beta_R-\theta_{LR}-\alpha_R)} = \frac{\lambda_C}{\sin(\theta_{LR})}. \quad [7]$$

The positions of beacons 14a, 14b and 14c relative to sensor 12 can be calculated based on the calculated ranges. The relative heading of target 14 can then be determined by calculating the orientation of the frame of reference for target 14 from the known relative positions of beacons 14a, 14b and 14c on target 14.

In FIG. 3B, the description of the lengths and angles is identical to that for FIG. 3A. However, because legs $\lambda_R$ and $\lambda_L$ are on the interior of the triangle formed by O, L and R, the equivalent expression for Equation [3] is as follows:

$$\alpha_L = \pi - \beta_L - \beta_R - \theta_{LR} - \alpha_R. \quad [8]$$

The expression for $r_C$ equivalent to Equation [4] is:

$$r_C = \frac{\lambda_L \sin(\pi - \beta_L - \beta_R - \theta_{LR} - \alpha_R)}{\sin(\theta_{LC})}. \quad [9]$$

Substituting this expression for $r_C$ into Equation [1] results in the following expression, which, as in Equation [5], has $\alpha_R$ as the only unknown:

$$\lambda_L \sin(\pi - \beta_L - \beta_R - \theta_{LR} - \alpha_R)\sin(\theta_{RC}) = \lambda_R \sin(\theta_{LC})\sin(\alpha_R). \quad [10]$$

As described previously relative to FIG. 3A, the value of $\alpha_R$ can be solved numerically. Again, any negative or unrealistic solution that results in negative values for $r_L$, $r_R$ and $r_C$ can be discarded. The solution for $\alpha_R$ can be used in Equation [9] to calculate the value of $r_C$. The value of $r_L$ can be calculated from the following, developed from the law of sines:

$$\frac{r_L}{\sin(\alpha_R + \beta_R)} = \frac{\lambda_C}{\sin(\theta_{LR})}. \quad [11]$$

The value of $r_R$ is calculated in a similar manner from the following:

$$\frac{r_R}{\sin(\pi - \beta_L - \theta_{LR} - \alpha_R)} = \frac{\lambda_C}{\sin(\theta_{LR})}. \quad [12]$$

The use of the two geometries in FIGS. 3A and 3B, along with the knowledge of the relative distribution of beacons 14a, 14b and 14c on target 14 allows for the unambiguous determination of the position and heading of target 14. Without specifying the relative distribution of beacons 14a, 14b and 14c, and given only the relative bearings from sensor 12 to each of beacons 14a, 14b and 14c, the geometries in FIGS. 3A and 3B are both valid configurations. Knowing the relative distribution of beacons 14a, 14b and 14c on target 14 and the relative positions of beacons 14a, 14b and 14c in image 18 (given that target 14 is upright) invalidates one of the possible geometries.

Referring now to FIGS. 4A through 4F, there are illustrated plan views of the six possible configurations of beacons 14a, 14b and 14c as observed by sensor 12. The line OF corresponds to a line projecting radially from the center of sensor 12 in the plane of the triangle formed by beacons 14a, 14b and 14c. Lines are drawn from point O to each of beacons 14a, 14b and 14c to illustrate their relative positions.

If beacon 14c is the leftmost and the rightmost is beacon 14b (FIG. 4A), or beacon 14a is the leftmost and the rightmost is beacon 14c (FIG. 4B), or beacon 14b is the leftmost and the rightmost is beacon 14a (FIG. 4C), then beacons 14a, 14b and 14c must have the geometry shown in FIG. 3A. Similarly, if beacon 14a is the leftmost and the rightmost is beacon 14b (FIG. 4D), or beacon 14b is the leftmost and the rightmost is beacon 14c (FIG. 4E), or beacon 14c is the leftmost and the rightmost is beacon 14a (FIG. 4F), then beacons 14a, 14b and 14c must have the geometry shown in FIG. 3B.

An alternate approach to the law of sines applies the law of cosines. According to the law of cosines (using the same notations relative to FIGS. 3A and 3B), the relationships between the measured angles, the geometry of beacons 14a, 14b and 14c and the distances between reference point O and beacons 14a, 14b and 14c are as follows:

$$\lambda_L^2 = r_L^2 + r_C^2 - 2r_L r_C \cos(\theta_{LC}); \quad [13]$$

$$\lambda_R^2 = r_R^2 + r_C^2 - 2r_R r_C \cos(\theta_{RC}); \quad [14]$$

and $$\lambda_C^2 = r_L^2 + r_R^2 - 2r_L r_R \cos(\theta_{LR}). \quad [15]$$

As was the case in using the law of sines, the values of $r_L$, $r_R$ and $r_C$ can be solved numerically based on Equations [13], [14] and [15]. Two solutions exist with positive real roots. One such solution will correspond to the correct geometry and the other to a reflected image in which the order of beacons 14a, 14b and 14c is reversed. As previously described, the correct solution will have the same order as in corresponding image 18. This additional constraint results in an unambiguous localization solution, assuming target 14 remains upright.

Figure 5:
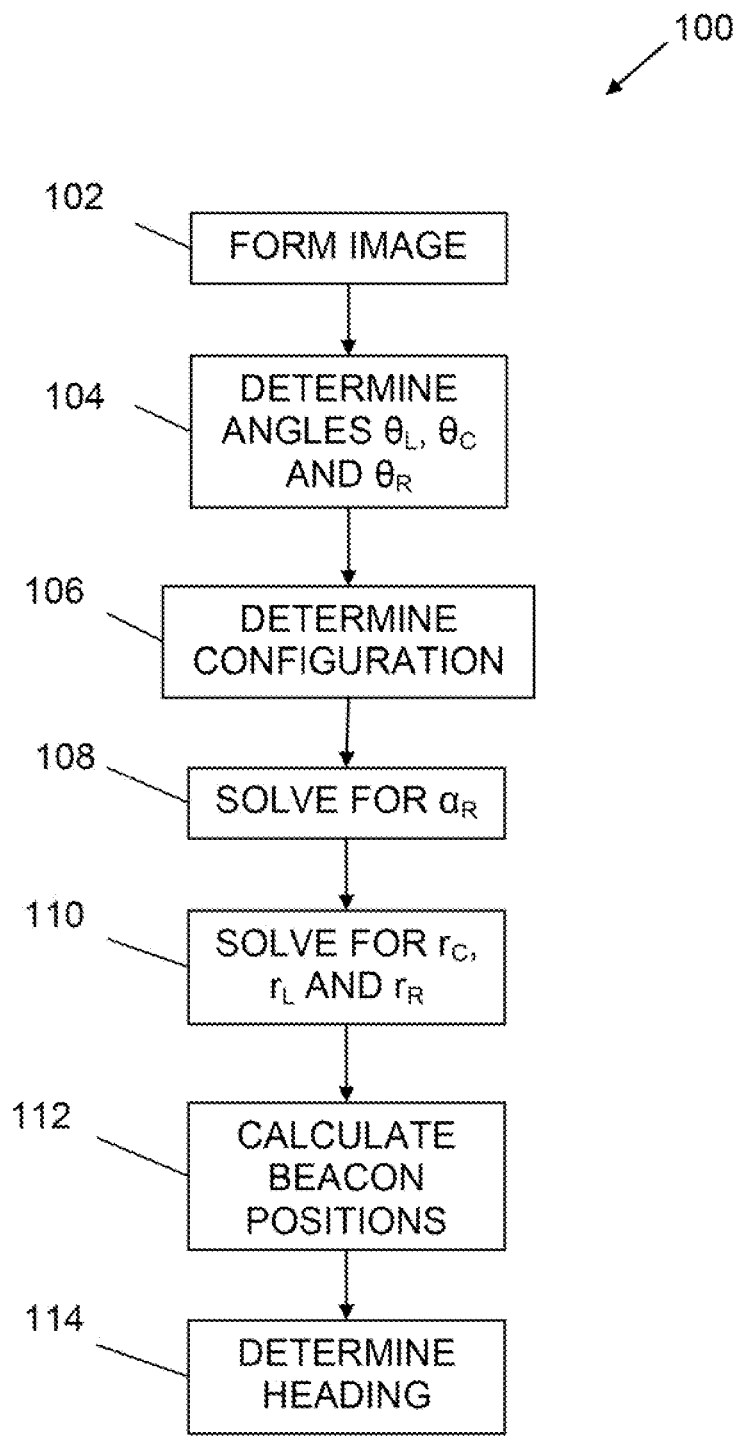
FIG. 5 is a block diagram of a localization method based on the system of FIG. 1.

Referring now to FIG. 5, there is shown a block diagram of method 100 for localization of a target. At block 102, sensor 12 observes beacons 14a, 14b and 14c to form image 18. By observing beacons 14a, 14b and 14c, angles $\theta_L$, $\theta_C$ and $\theta_R$ are determined (block 104). Additionally, based on the positions of beacons 14a, 14b and 14c in image 18, and knowing the possible configurations shown in FIGS. 4A through 4F, the configuration of target 14 can be determined to conform either to FIG. 3A, or to FIG. 3B (block 106).

At block 108, processor 16 numerically solves for the value of $\alpha_R$, based on the configuration and the known geometry of beacons 14a, 14b and 14c. At block 110, processor 16 further solves for $r_C$, $r_L$ and $r_R$. As previously described, the equations used by processor 16 at blocks 108 and 110 will depend on the configuration determined at block 106. For a configuration conforming to FIG. 3A, processor 16 uses Equation [5] to solve for the value of $\alpha_R$, and Equations [4], [6] and [7] to solve for $r_C$, $r_L$ and $r_R$, respectively. For a configuration conforming to FIG. 3B, processor 16 uses Equation [10] to solve for the value of $\alpha_R$, and Equations [9], [11] and [12] to solve for $r_C$, $r_L$ and $r_R$, respectively.

The positions of beacons 14a, 14b and 14c relative to sensor 12 can be calculated based on the calculated ranges (block 112). The relative heading of target 14 can then be determined by calculating the orientation of the frame of reference for target 14 from the known relative positions of beacons 14a, 14b and 14c on target 14 (block 114).

Obviously many modifications and variations of the present invention may become apparent in light of the above teachings. For example, beacons 14a, 14b and 14c can be uniquely identifiable by a number of means. Each beacon can be of a unique wavelength, or the beacons can have identical wavelengths, but pulse at prescribed frequencies.

Additionally, if multiple targets are to be localized and the beacon sets on each target are identical, each target 14 can be uniquely identified by activating beacons 14a, 14b and 14c according to a schedule that is shared by beacon controller 14d and processor 16. Processor 16 and beacon controller 14d for each target 14 can be time-synchronized such that only one set of target beacons is activated at any given time. The target identity for the active set of beacons is determined uniquely by association in the schedule. Alternately, each possible target can have a unique set of beacons.

Although the approach shown determines the relative position and orientation of target 14, it is understood that the absolute position and orientation of target 14 can be determined if the absolute position and orientation of sensor 12 are known. Also, three beacons are shown in the figures, since this is the minimum number of beacons necessary to determine the target's relative position. However, more than three beacons can be used for each target so as to ensure that at least three beacons are visible from sensor 12.

Although a numerical approach for solving the range and aspect has been presented in the discussion, alternative approaches can be used. For example, genetic algorithms or optimization algorithms that iterate a solution based on a fitness function can also be used.

What have thus been described are systems and methods for unambiguously determining the range, bearing, and relative heading of a neighboring object, or target, relative to a reference point. The systems and methods utilize a triangulation-based approach, wherein the range and heading information is based on measurements of angles between a reference coordinate system superposed on the reference point to beacons mounted to the target. The beacons can include a minimum of three uniquely discernible beacons mounted to the neighboring object. A sensor capable of detecting the beacons is mounted at the reference point. The range and heading of the target, or neighboring object, can be calculated by an analysis of the geometries of the beacons and the reference point.

Because three beacons are located on the target, the systems and methods described herein are able to determine the aspect of the target in addition to the range in the reference coordinate system, given prior information on the relative orientation of beacons to each other and the target. The relative orientation of beacons also introduces an additional constraint that enables identification of the appropriate geometry that results in a unique solution for the range and aspect of the target.

As described herein, the relative localization systems and methods have a number of advantages over current localization systems and methods. These include the fact that the systems and methods described herein have no communication requirements, i.e., sensor 12 does not communicate directly with target 14. Additionally, the components are currently widely commercially available and are low cost. The beacons can be any luminous source, including light-emitting diode arrays.

Although the beacons serve as emitters, position information or state information is not broadcast explicitly. Further, energy used for detection is not radiated as it is for active radar, sonar, or lidar systems. Rather, the systems and methods described herein can be viewed as analogous to a passive sonar system.

It will be understood that many additional changes in details, materials, steps, and arrangements of parts which have been described herein and illustrated in order to explain the nature of the invention, may be made by those skilled in the art within the principle and scope of the invention as expressed in the appended claims.

What is claimed is:

1. A method for localization of a first target, comprising:
   sensing at a reference point a relative position of each of at least three beacons, said beacons having a predetermined geometric relationship on said first target;
   determining a bearing angle for each of said beacons relative to said reference point;
   determining a configuration of said beacons based on said relative position;
   calculating a range from each of said beacons to said reference point based on said predetermined geometric relationship, said bearing angle for each of said beacons and said configuration; and
   determining a heading of said first target relative to said reference point based on said range from each of said beacons and said configuration.

2. The method of claim 1, wherein calculating a range further comprises calculating an angle between a line, $r_R$, from said reference point, O, to a rightmost one of said beacons, R, and a line, $\lambda_R$, from a center one of said beacons, C, to R.

3. The method of claim 2, wherein calculating an angle further comprises numerically analyzing an expression for said angle, $\alpha_R$, wherein:

$$\lambda_L \sin(\pi+\beta_L+\beta_R-\theta_{LR}-\alpha_R)\sin(\theta_{RC})=\lambda_R \sin(\theta_{LC})\sin(\alpha_R),$$

when said configuration is a first configuration having a line, $r_C$, from said point O to C that intersects a line, $\lambda_C$, between a leftmost one of said beacons, L, and R:

$$\lambda_L \sin(\pi-\beta_L-\beta_R-\theta_{LR}-\alpha_R)\sin(\theta_{RC})=\lambda_R \sin(\theta_{LC})\sin(\alpha_R),$$

when said configuration is a second configuration wherein said line $r_C$ does not intersect said line $\lambda_C$, and wherein:

$\lambda_L$ is a line from L to C;

$\beta_L$ is an angle formed between said line $\lambda_L$ and said line $\lambda_C$;

$\beta_R$ is an angle formed between said line $\lambda_R$ and said line $\lambda_C$;

$\theta_{LR}$ is an absolute value of a difference between a bearing of said line $r_R$ and a bearing of a line, $r_L$, from said point O to L;

$\theta_{RC}$ is an absolute value of a difference between said bearing of said line $r_R$ and a bearing of said line $r_C$; and $\theta_{LC}$ is an absolute value of a difference between said bearing of said line $r_L$ and said bearing of said line $r_C$.

4. The method of claim 3, wherein calculating a range further comprises solving expressions for said line $r_L$, said line $r_C$ and said line $r_R$, wherein, for said first configuration:

$$r_C = \frac{\lambda_L \sin(\pi + \beta_L + \beta_R - \theta_{LR} - \alpha_R)}{\sin(\theta_{LC})},$$

$$\frac{r_L}{\sin(\alpha_R - \beta_R)} = \frac{\lambda_C}{\sin(\theta_{LR})}$$

and $$\frac{r_R}{\sin(\pi + \beta_R - \theta_{LR} - \alpha_R)} = \frac{\lambda_C}{\sin(\theta_{LR})};$$

and, for said second configuration $$r_C = \frac{\lambda_L \sin(\pi - \beta_L - \beta_R - \theta_{LR} - \alpha_R)}{\sin(\theta_{LC})},$$

$$\frac{r_L}{\sin(\alpha_R + \beta_R)} = \frac{\lambda_C}{\sin(\theta_{LR})}$$

and $$\frac{r_R}{\sin(\pi - \beta_L - \theta_{LR} - \alpha_R)} = \frac{\lambda_C}{\sin(\theta_{LR})}.$$

5. The method of claim 1, further comprising emitting radiation from each of said beacons at differing wavelengths to enable identification.

6. The method of claim 1, further comprising pulsing each of said beacons at differing frequencies to enable identification.

7. The method of claim 1, wherein numerically analyzing comprises application of at least one of Newton's method, a method of bisection, a genetic algorithm and an optimization algorithm.

8. The method of claim 1, wherein calculating a range further comprises analyzing expressions for a range, $r_L$, between said reference point, O, and a leftmost one of said beacons, L, a range, $r_C$, between said point O and a center one of said beacons, C, and a range, $r_R$, between said point O and a rightmost one of said beacons, R, wherein:

$$\lambda_L^2 = r_L^2 + r_C^2 - 2r_L r_C \cos(\theta_{LC}),$$

$$\lambda_R^2 = r_R^2 + r_C^2 - 2r_R r_C \cos(\theta_{RC})$$

and $$\lambda_C^2 = r_L^2 + r_R^2 - 2r_L r_R \cos(\theta_{LR}),$$

in which
- $\lambda_L$ is a line from L to C;
- $\lambda_R$ is a line from C to R;
- $\lambda_C$ is a line from L to R;
- $\theta_{LC}$ is an absolute value of a difference between a bearing of said line $r_L$ and a bearing of said line $r_C$;
- $\theta_{RC}$ is an absolute value of a difference between a bearing of said line $r_R$ and said bearing of said line $r_C$; and
- $\theta_{LR}$ is an absolute value of a difference between said bearing of said line $r_R$ and said bearing of said line $r_L$.

9. The method of claim 8, wherein analyzing comprises application of at least one of Newton's method, a method of bisection, a genetic algorithm and an optimization algorithm.

10. The method of claim 1, further comprising timing emissions from said at least three beacons to correspond with a predetermined schedule.

11. The method of claim 10, further comprising localizing additional targets, wherein said timing differs for each of said additional targets and said first target according to said schedule.

12. A target localization system, comprising:
a set of at least three beacons, said set being located on said target in a predetermined geometric relationship; and
a sensor located a distance from said target, said sensor attuned to receive emissions from each of said beacons.

13. The system of claim 12, further comprising:
a processor connected to said sensor; and
processor readable medium disposed on said processor and containing instructions for:
determining a bearing angle for each of said beacons relative to said sensor; and
calculating a range from each of said beacons to said sensor based on said predetermined geometric relationship and said bearing angle for each of said beacons.

14. The system of claim 13, wherein said instructions further comprise instructions for:
determining a configuration of said beacons based on said bearing angle for each of said beacons; and
determining a heading of said target relative to said sensor based on said range from each of said beacons and said configuration.

15. The system of claim 14, further comprising a controller connected to said beacons, said controller pulsing each of said beacons at differing frequencies to enable identification of each of said beacons by said sensor.

16. The system of claim 14, further comprising a controller connected to said beacons, said controller differing wavelengths of said emissions from each of said beacons to enable identification of each of said beacons by said sensor.

* * * * *